INVENTOR
THOMAS F. MULDOWNEY

United States Patent Office

3,005,438
Patented Oct. 24, 1961

3,005,438
RIGGING SYSTEM FOR FLOAT-SUPPORTED
SUBMERGED BODIES
Thomas F. Muldowney, Panama City, Fla., assignor to the United States of America as represented by the Secretary of the Navy
Filed June 2, 1960, Ser. No. 33,607
5 Claims. (Cl. 114—235)
(Granted under Title 35, U.S. Code (1952), sec. 266)

The invention described herein may be manufactured and used by or for the Government of the United States of America for governmental purposes without the payment of any royalties thereon or therefor.

The present invention relates to a rigging system for float supported water submerged bodies and more particularly to a rigging system which will prevent shock loads when the float supporting the body encounters a rough sea. The invention is especially useful in such systems wherein the buoyancy of the float is much greater than necessary merely to support the submerged body.

Bulky bodies submerged in water are notably torpid in that they offer great resistance to acceleration and when such a body is supported by a surface float of great buoyancy through rods, chains, cables or the like of fixed length, the float moves up and down in a rough sea causing the support cable to slacken and then pull tight to produce a shock load sufficient to break a cable which is otherwise of adequate strength to accomplish its purpose. When the submerged body being supported is massive or large in its horizontal cross section, its resistance to sudden vertical movement is so great that it appears to its wave tossed supporting float to be an almost immovable object. Shock absorbers have been incorporated in such supporting cables but the problem of coping with say 12 foot swells is great and to date they have been ineffective to prevent damage in systems in which the submerged body is relatively massive and the float is buoyant enough to respond to wave action. Accordingly, an object of the invention is to provide a rigging system for a submerged body supported by a surface float which prevents shock loads in the system when the float is anchored in a rough sea.

A further object of the invention is to provide for the stable suspension of a float supported submerged body.

Another object of the invention is to provide a hydrofoil spread which permits its float members at anchor to follow wave action without attempting to impart corresponding movements to the hydrofoil.

Other objects as well as attendant advantages of the invention will become evident from the following disclosure.

In accordance with the invention, the submerged body, such as a stabilized platform supported under a ship or a hydrofoil to be float supported at a selected depth, is itself positively buoyant and is restrained in submerged position by providing the supporting member or members with a negative buoyancy greater than the positive buoyancy of the body. Also in accordance with the invention, the hydrofoil or other body is coupled to its supporting member by a loss motion connection for accommodating vertical motion of the member caused by the float following wave and swell action whereby such short term excursions of the member are not imparted to the hydrofoil which remains substantially stationary. In the preferred embodiment of the invention, the loss motion coupling between the supporting cable and the supported body comprises two stop members secured in spaced relation along the distal end of the support cable with the intervening segment of cable passing through a fairlead through the body which fairlead will not permit passage of the stop members thereby confining possible movement of the body to that segment of the cable defined by the two stop members.

It is known that float supported spreads derive from wave action a lifting force which is a function of the ratio between the magnitudes of the positive buoyancy and the real or apparent mass of the spreads and that when such ratio is quite small very little resistance is offered to their being submerged as is quite apparent from observing a waterlogged timber which floats with its top surface barely awash. In the case of float supported spreads which for some reason have excess buoyancy, the lifting force due to wave action can become quite large and if suitable precautions are not taken, destructive as well. This latter class of spreads includes float-supported hydrofoils for generating negative pressure, and submerged platforms and the like supported from surface vessels. The hydrofoil spread when at anchor requires only that the spread be buoyant but when under tow the negative angle of attack of the hydrofoil increases its apparent weight manyfold and the buoyancy in its supporting float required to offset this increased apparent weight constitutes excess buoyancy when the spread is at anchor, hence the need for the rigging provided by the present invention. In the case of a ship-supported submerged platform, the ship has ample excess buoyancy such that the use of the present invention is highly desirable not only for eliminating shock loads in the rods or cables supporting the submerged platform but additionally greatly increasing the platform's stability. Inasmuch as the rigging system of the invention is functionally indifferent to the end purpose of the submerged body being supported, the preferred embodiment of the invention will be described in detail only as incorporated in a hydrofoil spread.

In this preferred embodiment to be described for disclosing the invention, a hydrofoil is supported by float members provided with a bridle of tension cables for being towed by a surface vessel, the hydrofoil being supported transversely to and at a negative angle of attack in the direction of tow so that when the combination is under tow the apparent weight of the hydrofoil increases in excess of its built-in positive buoyancy resulting in the hydrofoil moving along the cables into contact with the terminal stop members. When the float members are anchored as through their tow lines, the hydrofoil slowly moves up into engagement with the upper stop members on the supporting cable where it remains substantially stationary at the lowest point in the up and down excursions of the stop members due to wave and sea action on the floats.

The foregoing will be better understood by reference to the accompanying drawing illustrating a preferred embodiment of the invention in which drawing like numerals are applied to the same or corresponding parts in the different figures. In this drawing.

Figure 1:
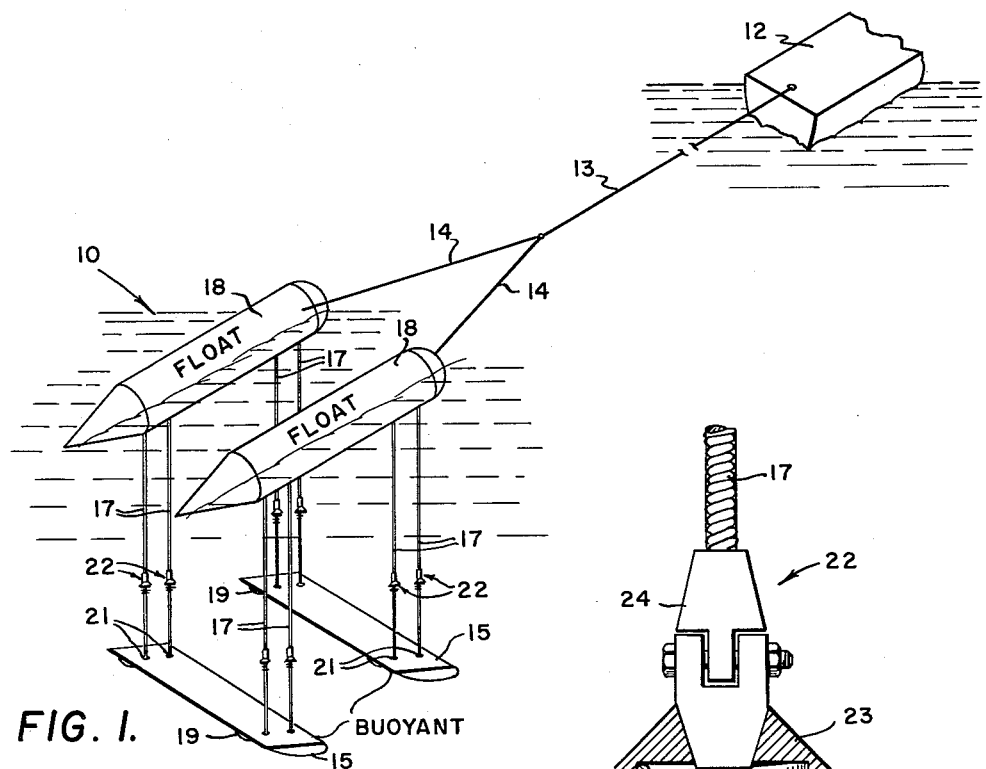
FIG. 1 is a view in perspective of a body of water in which a hydrofoil spread constructed in accordance with the invention is being towed.
Figure 3:
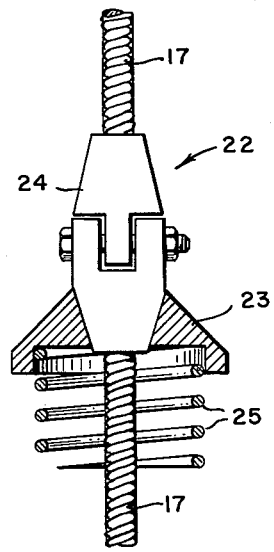
FIG. 3 is a sectional view of a cable mounted stop member.
Figure 2:
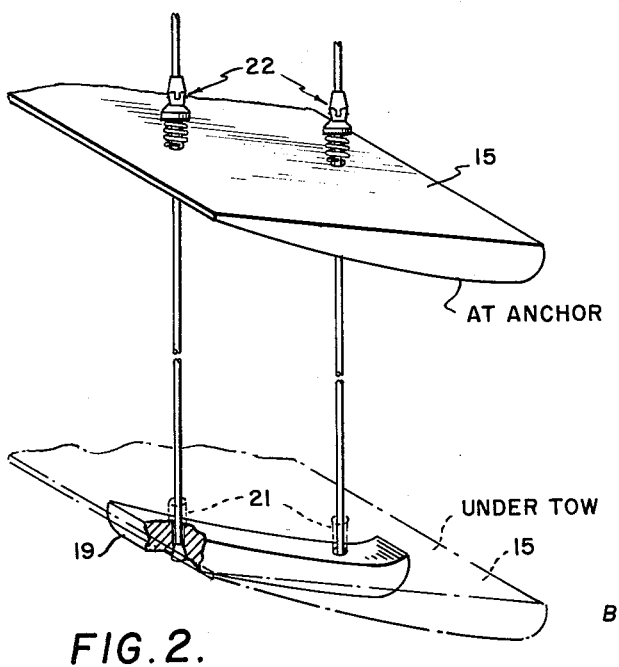
FIG. 2 is a fragmentary view partly in section of a hydrofoil mounting arrangement and indicating alternate positions of the hydrofoil.

As shown in FIG. 1, a hydrofoil spread 10 is shown being towed through a body of water by a surface vessel 12 through a towline 13 and a bridle comprising tension cables 14. The hydrofoil spread 10 comprises hydrofoils 15 submerged in the body of water and supported through a plurality of cable pairs 17 secured to float members 18 to which the bridle cables 14 are secured. The depending distal ends of each cable pair 17 have secured thereto heavy weights here shown as cradle members 19 which maintain each cable pair 17 in fixed relation and functions to support the foils 15 when under tow at the desired negative angle of attack, such angle being selected by suitable adjustment of the relative lengths of the cables in each pair 17 in a known manner by mechanism (not shown) carried by the floats 18. In accordance with the invention, the hydrofoils 15 constructed to have positive buoyancy in the water are provided with fairleads 21 through which the supporting cables 17 are threaded. Stop members 22 for limiting the upper movement of the hydrofoils 15 are fastened to each of the supporting cables 17 at a distance above the terminal cradles 19 which preferably is at least equal to the maximum height of sea swell expected in the water where the hydrofoil spread 10 is to be anchored. It is thus evident that the hydrofoils 15 are coupled to the supporting cables 17 by a loss motion connection which constrains the hydrofoils 15 to some position between the stop members 22 and the cradle members 19. As shown in FIG. 3, the stop members 22 may be of a known type comprising cable fittings 24 carrying a spring seat 23 provided with a compression spring 25. In order that the hydrofoils 15 when at rest will assume an orientation such that when they are placed under tow their apparent weight will increase, provision is made that this desired negative angle of attack in the rest position is assured by any suitable means and can be accomplished very simply by positioning the forward stop member 22 on each pair of cables 17 lower than its associated aft stop member 22 as indicated in FIGS. 1 and 2.

In connection with the foregoing description of the system illustrated in FIGS. 1 and 2, it is to be understood that the combined negative buoyancy of the cradle members 19 or their equivalents, the cables 17 and the stop members 22 exceeds the positive buoyancy of their associated hydrofoils 15 and that preferably the major portion of such negative buoyancy is concentrated in the cradle members 19 or otherwise below the position of the hydrofoils 15 when the spread is under tow, this latter for the purpose of increasing stability by aiding the hydrofoils 15 to fly directly below their supporting floats 18, i.e., to keep to a minimum the angle the supporting cables 17 make with the vertical.

In a representative spread the hydrofoils 15 are constructed to have a positive buoyancy in water of approximately one pound per square foot of its upper surface area which buoyancy may be provided in any suitable manner as by securing streamlined floats to the ends of the hydrofoils 15 or each of the hydrofoils 15 may be filled with buoyant material such as foamed-in-place plastic. In this same spread the combined negative buoyancy of the bottom stop members, e.g., the cradles 19, is approximately twice the total positive buoyancy of the hydrofoils 15. The weight of the supporting cables 17 and the upper stop members 22 being of very minor importance, they are chosen solely for performing their respective primary functions of supporting the hydrofoils 15 when the spread is under tow and of restraining the upward movement of the hydrofoils when the spread is at anchor. Also, in order to support the apparent weight of the hydrofoil when under tow, the positive buoyancy of the floats 18 is of the order of 10 times the at rest negative buoyancy of the cables 17 and their associated stop members. When this representative spread is anchored through its bridle 14 or preferably its tow cable 13, the float members 18 follow waves and swells without stressing the support cables 17 which merely slide up and down through the fairleads 21 in the hydrofoils 15 with the upper stop members 22 repositioning the hydrofoils 15 during each trough and since the separation between the bottom stop members 19 and the upper stop members 22 is greater than the amplitude of waves or swells at this anchorage the bottom stop members 19 never reach the hydrofoils 15. When the upper stop members 22 are raised out of contact with the hydrofoils 15 these latter slowly start to rise and when the stop members 22 during their next downward excursion again contact the hydrofoils 15 there is of course an impact, albeit small, which can be minimized by any suitable shock absorbing means such as a coil compression spring 25 secured to the upper surface of the hydrofoils 15 concentric with their fairleads 21 or preferably as shown in FIG. 3 to the lower surface of each upper stop member 22. The stroke of these springs 25 under the forces involved should desirably approximate the distance of upward movement due to their positive buoyancies of the hydrofoils 15 during the interval between successive troughs in the waves or swells, e.g., 5 to 8 seconds.

It will be evident to those skilled in the art from the foregoing description of a preferred embodiment that many modifications may be made without departing from the invention, the scope of which is pointed out in the appended claims.

What is claimed is:

1. A hydrofoil spread adapted for towing by a vessel through a body of water including a tension cable, a buoyant surface float attached to said cable, a hydrofoil having a small positive buoyancy in the water, at least one support cable dependent from said float and extending through a fairlead in said hydrofoil, cable stop members secured to said support cable above and below said hydrofoil, said cable stops and said support cable having a negative buoyancy greater than the positive buoyancy of said hydrofoil, the major portion of such negative buoyancy being concentrated adjacent said lower stop member, and said two stop members being spaced along said support cable by a distance substantially equal to the maximum height of sea swell expected in the waters where said spread is to be anchored.

2. A hydrofoil spread according to claim 1 in which said hydrofoil when at rest has an inclined surface which when the spread is under tow increases its apparent weight in excess of its inherent positive buoyancy whereby said hydrofoil migrates into engagement with said lower stop member.

3. Means for supporting a water submerged body at a stabilized depth comprising a buoyant surface float, at least one depending elongated support member secured to said float and constrained to substantially vertical orientation, a buoyant body having a fairlead through which the distal portion of said support member is threaded, the buoyancy of said body being small compared to the resistance said body offers to vertical movement in the water, and a stop member carried by said support member above said distal portion at the desired depth of submergence for said body.

4. Supporting means in accordance with claim 3 wherein the length of said distal portion of said support member exceeds the length of said fairlead by an amount at least equal to the maximum vertical excursion of said surface float in response to wave action.

5. Supporting means in accordance with claim 4 wherein the depending elongated support member is flexible and includes a weight secured to the distal end of said support member.

References Cited in the file of this patent

UNITED STATES PATENTS

| | | |
|---|---|---|
| 1,218,586 | Steinmetz | Mar. 6, 1917 |
| 1,305,483 | Matsumura | June 3, 1919 |